United States Patent
Wei (10) Patent No.: US 9,860,840 B2
(45) Date of Patent: Jan. 2, 2018

(54) SYSTEM, METHOD, AND SERVER FOR KEEPING WIRELESS LOCAL AREA NETWORK TERMINAL ONLINE ALL THE TIME

(71) Applicant: ZTE Corporation, Shenzhen (CN)

(72) Inventor: Yuan Wei, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/916,755

(22) PCT Filed: Apr. 16, 2014

(86) PCT No.: PCT/CN2014/075508
§ 371 (c)(1),
(2) Date: Mar. 30, 2016

(87) PCT Pub. No.: WO2014/173247
PCT Pub. Date: Oct. 30, 2014

(65) Prior Publication Data
US 2016/0219521 A1    Jul. 28, 2016

(30) Foreign Application Priority Data

Sep. 4, 2013 (CN) .......................... 2013 1 0400159

(51) Int. Cl.
*H04W 52/02* (2009.01)
*H04L 29/08* (2006.01)
(Continued)

(52) U.S. Cl.
CPC ..... *H04W 52/0229* (2013.01); *H04L 61/2007* (2013.01); *H04L 67/24* (2013.01);
(Continued)

(58) Field of Classification Search
CPC ......... H04W 52/0216; H04W 52/0219; H04W 24/00; H04W 68/00; H04W 52/02; H04B 1/1615

See application file for complete search history.

(56) References Cited

U.S. PATENT DOCUMENTS 6,463,307 B1    10/2002 Larsson
9,485,728 B1 *   11/2016 Banerjea ........... H04W 52/0212
(Continued)

FOREIGN PATENT DOCUMENTS

CN    101552740 A    10/2009
CN    102891877 A     1/2013
(Continued)

OTHER PUBLICATIONS

Supplementary European Search Report in European application No. 14788489.4, dated Aug. 1, 2016.
(Continued)

*Primary Examiner* — Mohamed Kamara
(74) *Attorney, Agent, or Firm* — Oppedahl Patent Law Firm LLC (57) ABSTRACT

A system and method for keeping a Wireless Local Area Network (WLAN) terminal always online is provided. The method includes: the WLAN terminal, configured to receive and execute an online/offline strategy formulated by an online state server, and notify the online state server of its own state change when its own state has been switched into an online state or is about to be switched into an offline state; the online state server, configured to formulate and send the online/offline strategy to the WLAN terminal; and an online data caching server, configured to receive a notice about the online/offline state of the WLAN terminal, cache data sent by each data source to the WLAN terminal after the WLAN terminal is switched into the offline state, and transmit the
(Continued)

cached data to the WLAN terminal after the WLAN terminal is switched into the online state.

16 Claims, 4 Drawing Sheets

(51) Int. Cl.
*H04L 29/12* (2006.01)
*H04W 84/12* (2009.01)

(52) U.S. Cl.
CPC ...... *H04L 67/2842* (2013.01); *H04L 67/2861* (2013.01); *H04W 52/0206* (2013.01); *H04W 84/12* (2013.01); *Y02B 60/50* (2013.01)

(56) References Cited

U.S. PATENT DOCUMENTS

| 2005/0018624 | A1* | 1/2005 | Meier | H04L 29/12028 |
| | | | | 370/318 |
| 2009/0034492 | A1 | 2/2009 | Narasimhan | |
| 2009/0245150 | A1* | 10/2009 | Tsao | H04L 12/289 |
| | | | | 370/311 |
| 2012/0170499 | A1 | 7/2012 | Narasimhan | |
| 2014/0003406 | A1* | 1/2014 | Kamath | H04W 76/045 |
| | | | | 370/338 |
| 2014/0129859 | A1* | 5/2014 | O'Malley | G06F 1/3209 |
| | | | | 713/323 |

FOREIGN PATENT DOCUMENTS

| CN | 103200214 A | 7/2013 |
| KR | 20130004848 A | 1/2013 |
| WO | 9627993 A1 | 9/1996 |
| WO | 0010353 A1 | 2/2000 |

OTHER PUBLICATIONS

International Search Report in international application No. PCT/CN2014/075508, dated Jul. 16, 2014.
English Translation of the Written Opinion of the International Search Authority in international application No. PCT/CN2014/075508, dated Jul. 16, 2014.

* cited by examiner

SYSTEM, METHOD, AND SERVER FOR KEEPING WIRELESS LOCAL AREA NETWORK TERMINAL ONLINE ALL THE TIME

TECHNICAL FIELD

The disclosure relates to the field of Wireless Local Area Network (WLAN) communication, and in particular to a system and method for keeping a WLAN terminal always online and a server.

BACKGROUND

Large-scale development of a WLAN makes a smart WLAN terminal with mobility and portability more and more popular. However, a WLAN module in a smart WLAN terminal is power-consuming, and a user has to disable the WLAN module for long to save power.

Figure 1:
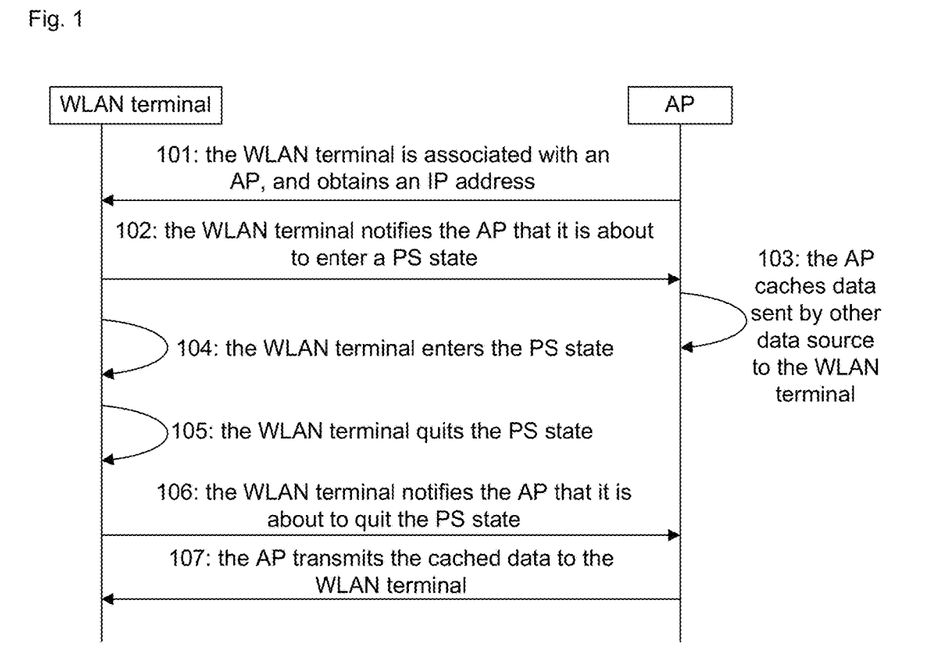
FIG. 1 is a flowchart of PS according to an 802.11 standard.

At present, in order to keep a WLAN terminal always online to develop more services, an 802.11 standard defines a Power Save (PS) function. FIG. 1 is a flowchart of PS according to an 802.11 standard, and as shown in FIG. 1, the PS flow includes the following steps.

Step 101: a WLAN terminal is associated with an Access Point (AP) to obtain an Internet Protocol (IP) address.

Here, the WLAN terminal is associated with the AP for identity authentication through a WLAN interface, the WLAN terminal obtains the IP address from the AP after passing the identity authentication, and then the WLAN terminal performs data communication with a network.

Step 102: the WLAN terminal notifies the AP that the WLAN terminal is about to enter a PS state.

Here, before entering the PS state, the WLAN terminal may send a notice to the AP to notify the AP that the WLAN terminal is about to enter the PS state.

Step 103: the AP caches data sent by another data source to the WLAN terminal.

Here, the AP may cache the data sent by the other data source to the WLAN terminal after receiving the notice from the WLAN terminal in Step 102.

Step 104: the WLAN terminal enters the PS state.

After Step 102, the WLAN terminal disables a wireless transceiver to enter the PS state.

Specifically, a WLAN module of the WLAN terminal enters a sleep state, at which moment the WLAN terminal does not receive or send any data.

Step 105: the WLAN terminal quits the PS state.

Specifically, the WLAN terminal enables the wireless transceiver to quit the PS state, that is: the WLAN module of the WLAN terminal enters an active state, and the WLAN terminal performs normal data communication with the network.

Step 106: the WLAN terminal notifies the AP that it quits the PS state.

Step 107: the AP transmits the cached data to the WLAN terminal.

Specifically, the AP transmits the data cached when the WLAN terminal in the PS state to the WLAN terminal after receiving the notification from the WLAN terminal that the WLAN terminal quits the PS state, and then the WLAN terminal performs normal data communication with the network.

From the abovementioned flow, the PS flow in the existing 802.11 standard at least has the following problems:

1) the WLAN terminal is needed to frequently disable and enable the wireless transceiver to save power, and since disabling and enabling of the wireless transceiver cannot be automatically controlled by a network side, a service involving data transmission, such as an instant message and an advertisement, cannot be implemented, which greatly limits a network function;

2) the AP caches the data sent by other data sources when the WLAN terminal is in a sleep state, but for an AP focusing on wireless access, its processing capability and storage space are both limited, and cannot cache bulk data, and moreover, when multiple WLAN terminals enter the PS state, the AP may keep discarding data of the WLAN terminals due to limited processing capabilities and storage spaces, which may cause multiple retransmissions of a service message and frequent retransmissions for a lost packet, reduce network efficiency and lower a user experience greatly; and therefore, the method cannot meet the requirement on bulk data caching.

SUMMARY

In order to solve the existing technical problems, the embodiments of the disclosure provide a system, a method and a server for keeping a WLAN terminal always online.

An embodiment of the disclosure provides a system for keeping a WLAN terminal always online, which may include: the WLAN terminal, an online state server and an online data caching server, wherein the WLAN terminal may be configured to receive and execute an online/offline strategy formulated by the online state server, and notify the online state server of a state change of the WLAN terminal when a state of the WLAN terminal has been switched into an online state or is about to be switched into an offline state;

the online state server may be configured to formulate and send the online/offline strategy to the WLAN terminal; and the online data caching server may be configured to receive a notice about the online/offline state of the WLAN terminal, cache data sent by each data source to the WLAN terminal after the WLAN terminal is switched into the offline state, and transmit the cached data to the WLAN terminal after the WLAN terminal is switched into the online state.

In the solution, the system may further include: an AP, configured to be associated with the WLAN terminal; and the WLAN terminal may further be configured to be associated with the AP for identity authentication, and obtain an IP address after passing the identity authentication.

In the solution, the online state server may further be configured to record the online/offline state of the WLAN terminal after receiving the state change notified by the WLAN terminal.

In the solution, the WLAN terminal may further be configured to be registered with the online state server, and request to acquire the online/offline strategy formulated by the online state server; and correspondingly, the online state server may further be configured to transmit the online/offline strategy to the WLAN terminal after successful registration.

In the solution, the online state server may further be configured to initiatively transmit the online/offline strategy to the WLAN terminal after learning that the WLAN terminal passes identity authentication through other network element.

In the solution, the online data caching server may be an AP or other network element except the AP.

In the solution, when the online data caching server is the AP, the WLAN terminal may be configured to directly notify the online data caching server of the online/offline state of the WLAN terminal when the state of the WLAN terminal has been switched into the online state or is about to be switched into the offline state; the online data caching server may be configured to receive the notice about the online/offline state of the WLAN terminal, and notify the online state server of the online/offline state of the WLAN terminal; when the online data caching server is other network element except the AP, the WLAN terminal may be configured to notify the online state server of the online/offline state of the WLAN terminal when the state of the WLAN terminal has been switched into the online state or is about to be switched into the offline state; and the online state server may be configured to receive the notice about the online/offline state of the WLAN terminal, and notify the online data caching server of the online/offline state of the WLAN terminal.

In the solution, the system may further include: an application service server, configured to query the online/offline state of the WLAN terminal from the online state server, and develop a service according to a query result about the online/offline state of the WLAN terminal.

An embodiment of the disclosure further provides an online data caching server for keeping a WLAN terminal always online, which may include: a first state transceiver module, a caching module and a cached data sending module, wherein the first state transceiver module may be configured to receive and send a notice about an online/offline state of the WLAN terminal;

the caching module may be configured to cache data sent by each data resource to the WLAN terminal after the WLAN terminal is switched into the offline state; and the cached data sending module may be configured to transmit the data cached by the caching module to the WLAN terminal after the WLAN terminal is switched into the offline state.

In the solution, the notice may be a notice which is sent by the first state transceiver module according to an online/offline strategy formulated by an online state server when the WLAN terminal has been switched into the online state or is about to be switched into the offline state.

An embodiment of the disclosure further provides an online state server for keeping a WLAN terminal always online, which may include: a strategy formulation module, a strategy sending module, a second state transceiver module and a state recording and querying module, wherein the strategy formulation module may be configured to formulate an online/offline strategy for the WLAN terminal;

the strategy sending module may be configured to send the online/offline strategy formulated by the strategy formulation module to the WLAN terminal;

the second state transceiver module may be configured to receive and send a notice about an online/offline state, determined by the online/offline strategy, of the WLAN terminal; and the state recording and querying module may be configured to record the online/offline state of the WLAN terminal after receiving the notice about the online/offline state of the WLAN terminal, and provide service of querying the online/offline state of the WLAN terminal for an application service server.

An embodiment of the disclosure further provides a method for keeping a WLAN terminal always online, which may include that:

the WLAN terminal receives and executes an online/offline strategy formulated by an online state server, and notifies the online state server of a state change of the WLAN terminal when a state of the WLAN terminal has been switched into an online state or is about to be switched into an offline state;

an online data caching server receives a notice about the online/offline state of the WLAN terminal, and caches data sent by each data source to the WLAN terminal after the WLAN terminal is switched into the offline state; and the online data caching server transmits the cached data to the WLAN terminal after the WLAN terminal is switched into the online state.

In the solution, the method may further include that: the WLAN terminal is associated with an AP for identity authentication before receiving the online/offline strategy, and obtains an IP address after passing the identity authentication.

In the solution, the method may further include that: the online state server records the online/offline state of the WLAN terminal after receiving the state change notified by the WLAN terminal.

In the solution, the step that the WLAN terminal receives the online/offline strategy formulated by the online state server may include that:

the WLAN terminal is registered with the online state server, and requests to acquire the online/offline strategy formulated by the online state server, and the online state server transmits the online/offline strategy to the WLAN terminal after successful registration; or, the online state server initiatively transmits the online/offline strategy to the WLAN terminal after learning through other network element that the WLAN terminal passes identity authentication.

In the solution, the online data caching server may be the AP or other network element except the AP.

In the solution, when the online data caching server is the AP, the WLAN terminal may directly notify the online data caching server of the online/offline state of the WLAN terminal when the state of the WLAN terminal has been switched into the online state or is about to be switched into the offline state, and the online data caching server may receive the notice about the online/offline state of the WLAN terminal, and notify the online state server of the online/offline state of the WLAN terminal; and when the online data caching server is other network element except the AP, the WLAN terminal may notify the online state server of the online/offline state of the WLAN terminal when the state of the WLAN terminal has been switched into the online state or is about to be switched into the offline state, and the online state server may receive the notice about the online/offline state of the WLAN terminal, and notify the online data caching server of the online/offline state of the WLAN terminal.

In the solution, the method may further include that: an application service server queries the online/offline state of the WLAN terminal from the online state server, and develops a service according to a query result about the online/offline state of the WLAN terminal.

An embodiment of the disclosure further provides a method for keeping a WLAN terminal always online, which may include that:

a notice about an online/offline state change made when the WLAN terminal has been switched into an online state or is about to be switched into an offline state according to an online/offline strategy formulated by an online state server is acquired;

data sent by each data source to the WLAN terminal is cached after the WLAN terminal is switched into the offline state; and the cached data is transmitted to the WLAN terminal after the WLAN terminal is switched into the online state.

An embodiment of the disclosure further provides a computer-readable storage medium, which may include a set of instructions, the instructions being configured to execute the method for keeping a WLAN terminal always online in the embodiment of the disclosure.

According to the system, method and server for keeping a WLAN terminal always online provided by the embodiments of the disclosure, the WLAN terminal changes the online/offline state of the WLAN terminal according to the online/offline strategy formulated by an online state server; moreover, the WLAN terminal notifies the online state server of a state change of the WLAN terminal when a state of the WLAN terminal has been switched into the online state or is about to be switched into the offline state; the online data caching server receives the notice about the online/offline state of the WLAN terminal, and caches the data sent by each data source to the WLAN terminal after the WLAN terminal is switched into the offline state; the online data caching server transmits the cached data to the WLAN terminal after the WLAN terminal is switched into the online state; and in such a manner, the whole process is automatically controlled by a network side, thereby ensuring that the WLAN terminal is always kept online in a PS manner and performs normal data communication with a network, lowering packet loss retransmission traffic of a network and greatly improving a user experience.

In addition, a service provider may inquire of the online state server about the state of the WLAN terminal through a program interface; and the service provider may learn about the online/offline state of the WLAN terminal at any time through provided WLAN terminal state query service, so that timely and effective development of various services, such as a voice service, a videophone, an instant message, a notice and an advertisement, with a data transmission function may be ensured.

DETAILED DESCRIPTION

In the embodiments of the disclosure: a WLAN terminal receives and executes an online/offline strategy formulated by an online state server, and notifies the online state server of a state change of the WLAN terminal when a state of the WLAN terminal has been switched into an online state or is about to be switched into an offline state; an online data caching server receives a notice about the online/offline state of the WLAN terminal, and caches data sent by each data source to the WLAN terminal after the WLAN terminal is switched into the offline state; and after the WLAN terminal is switched into the online state, the online data caching server transmits the cached data to the WLAN terminal.

In the embodiments of the disclosure, the operation that the online/offline strategy is executed is implemented in a manner that the WLAN terminal changes its own online/offline state according to the online/offline strategy formulated by the online state server; and that is, time when the WLAN terminal is switched into the online state and time when the WLAN terminal is switched into the offline state are controlled by a network side.

Here, the online data caching server may be an AP or other network element except the AP.

The disclosure will be further described below with reference to the drawings and specific embodiments in detail.

Figure 2:
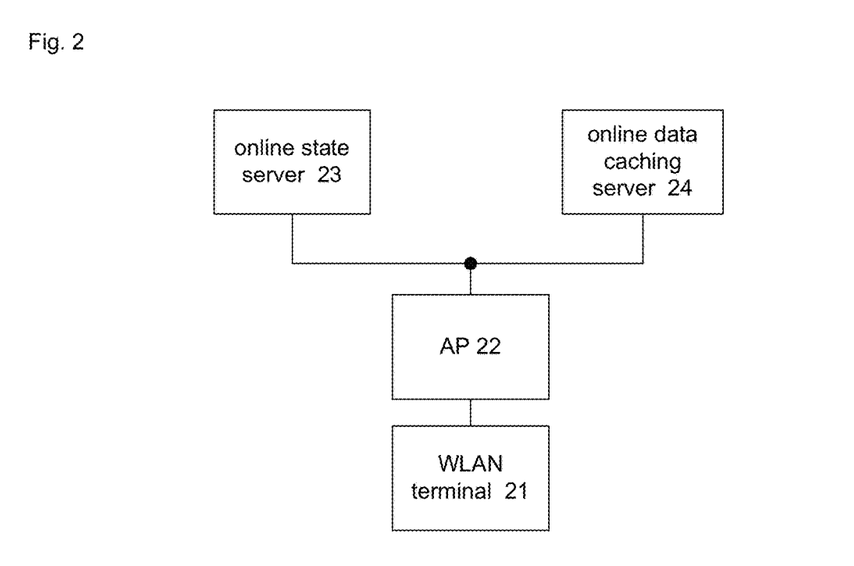
FIG. 2 is a structure diagram of a system according to an embodiment of the disclosure.

An embodiment of the disclosure provides a system for keeping a WLAN terminal always online. FIG. 2 is a structure diagram of a system according to an embodiment of the disclosure, and as shown in FIG. 2, the system for keeping the WLAN terminal always online includes: the WLAN terminal 21, an online state server 23 and an online data caching server 24, wherein the WLAN terminal 21 is configured to receive and execute an online/offline strategy formulated by the online state server 23, and notify the online state server 23 of a state change of the WLAN terminal when a state of the WLAN terminal has been switched into an online state or is about to be switched into an offline state;

the online state server 23 is configured to formulate and send the online/offline strategy to the WLAN terminal 21; and the online data caching server 24 is configured to receive a notice about the online/offline state of the WLAN terminal 21, cache data sent by each data source to the WLAN terminal 21 after the WLAN terminal 21 is switched into the offline state, and transmit the cached data to the WLAN terminal 21 after the WLAN terminal 21 is switched into the online state.

Preferably, the WLAN terminal 21 is further configured to perform data communication with a network after being switched into the online state; and the online state server 23 is further configured to record the online/offline state of the WLAN terminal 21 so as to provide the online/offline state of the WLAN terminal 21 for a third party.

The system further includes: an AP 22, configured to be associated with the WLAN terminal 21 through a WLAN interface; and correspondingly, the WLAN terminal 21 is further configured to be associated with the AP 22 for identity authentication, obtain an IP address after passing then identity authentication, and perform data communication with the network.

Here, the operation that the WLAN terminal 21 receives the online/offline strategy formulated by the online state server 23 includes that: the WLAN terminal 21 is registered with the online state server 23, and requests to acquire the online/offline strategy formulated by the online state server 23, and the online state server 23 transmits the online/offline strategy to the WLAN terminal 21 after successful registration; or, the online state serer 23 initiatively transmits the online/offline strategy to the WLAN terminal 21 after learning, through other network element, that the WLAN terminal 21 passes the identity authentication.

During the online state of any WLAN terminal 21, the online state server 23 may transmit an updated online/offline strategy to the WLAN terminal at any time.

Here, the online data caching server 24 may be the AP 22 or other network element except the AP;

when the online data caching server 24 is the AP 22, the WLAN terminal 21 directly notifies the online data caching server 24 of the online/offline state of the WLAN terminal by an Institute of Electrical and Electronic Engineers 802.11 (IEEE 802.11)-based Quality of Service (QoS) null data message when the state of the WLAN terminal has been switched into the online state or is about to be switched into the offline state; correspondingly, the online data caching server 24 receives the notice about the online/offline state of the WLAN terminal 21, and notifies the online state server 23 of the online/offline state of the WLAN terminal 21;

when the online data caching server 24 is other network element except the AP, the WLAN terminal 21 notifies the online state server 23 of the online/offline state of the WLAN terminal when the state of the WLAN terminal has been switched into the online state or is about to be switched into the offline state; and correspondingly, the online state server 23 receives the notice about the online/offline state of the WLAN terminal 21, and notifies the online data caching server 24 of the online/offline state of the WLAN terminal 21.

The online state server 23 and the AP 22 may also be configured to learn, through other network element except the AP, that the WLAN terminal is in the online state again.

Based on the system architecture shown in FIG. 2, the system for keeping the WLAN terminal always online may also include an additional application service server, and the the application service server may send a request of querying the state of the WLAN terminal 21 to the online state server 23 through a querying protocol, query the online/offline state of the WLAN terminal 21 from the online state server 23, and develop a service according to a query result about the online/offline state of the WLAN terminal 21.

Figure 3:
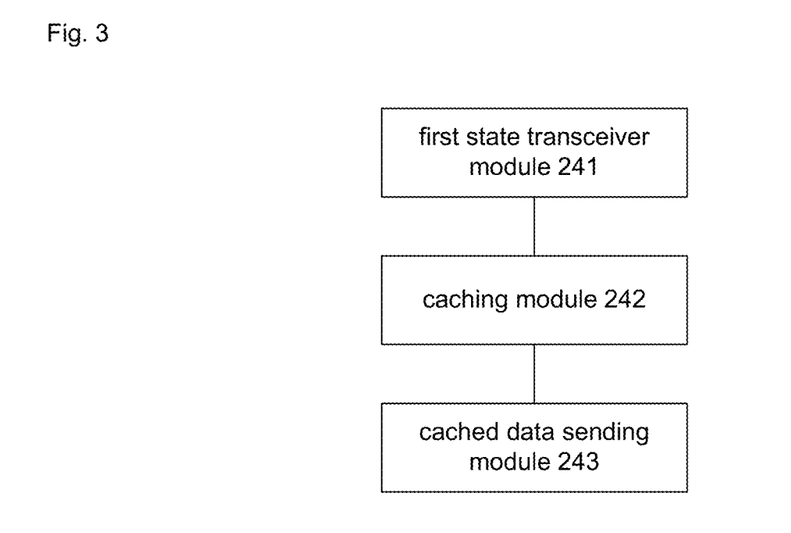
FIG. 3 is a structure diagram of an online data caching server according to an embodiment of the disclosure.

An embodiment of the disclosure provides an online data caching server for keeping a WLAN terminal always online, which is an AP or other network element except the AP.

Specifically, as shown in FIG. 3, the online data caching server includes: a first state transceiver module 241, a caching module 242 and a cached data sending module 243, wherein the first state transceiver module 241 is configured to receive and send a notice about an online/offline state of the WLAN terminal;

when the online data caching server is the AP, the first state transceiver module 241 receives the notice, which is sent by the WLAN terminal by an IEEE 802.11-based QoS null data message, about the online/offline state of the WLAN terminal, and sends the notice about the online/offline state of the WLAN terminal to an online state server; and when the online data caching server is other network element except the AP, the first state transceiver module 241 receives the notice about the online/offline state of the WLAN terminal from the online state server.

The caching module 242 is configured to cache data sent by each data resource to the WLAN terminal after the WLAN terminal is switched into the offline state.

The cached data sending module 243 is configured to transmit the data cached by the caching module to the WLAN terminal after the WLAN terminal is switched into the offline state.

It is to be noted that the first state transceiver module 241 and the cached data sending module 243 may be implemented by a chip with a communication function in the online data caching server, and the caching module 242 may be implemented by a caching chip in the online data caching server.

Figure 4:
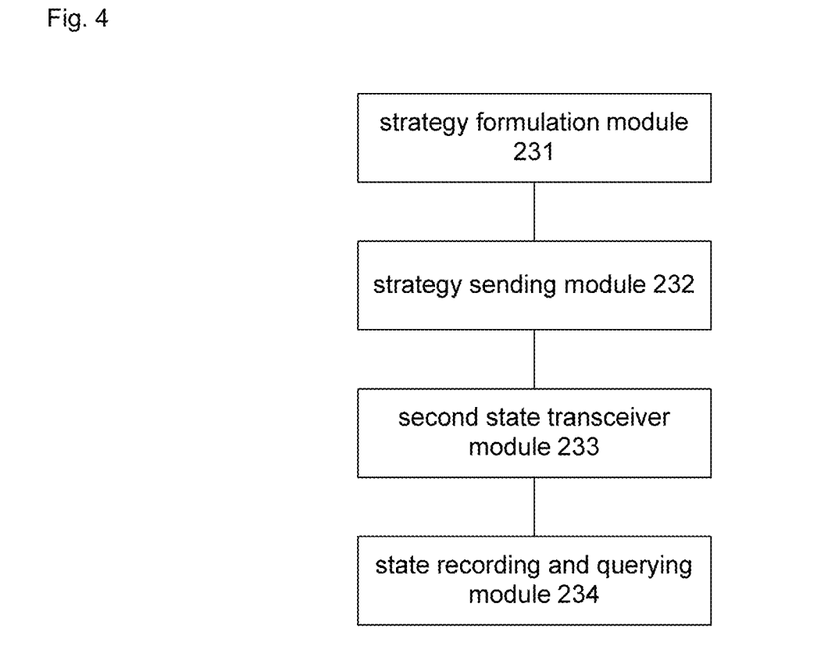
FIG. 4 is a structure diagram of an online state server according to an embodiment of the disclosure.

Correspondingly, an embodiment of the disclosure further provides an online state server for keeping a WLAN terminal always online, which includes: a strategy formulation module 231, a strategy sending module 232, a second state transceiver module 233 and a state recording and querying module 234, wherein the strategy formulation module 231 is configured to formulate an online/offline strategy for the WLAN terminal.

The strategy sending module 232 is configured to send the online/offline strategy formulated by the strategy formulation module 231 to the WLAN terminal, specifically including that:

the WLAN terminal is registered with the strategy sending module 231, and requests to acquire the online/offline strategy, and the strategy sending module 232 transmits the online/offline strategy to the WLAN terminal after successful registration; or, the strategy sending module 232 initiatively transmits the online/offline strategy to the WLAN terminal after learning through other network element that the WLAN terminal passes identity authentication; and during an online state of any WLAN terminal, the strategy sending module 232 may transmit an updated online/offline strategy to the WLAN terminal at any time.

The second state transceiver module 233 is configured to receive and send a notice about an online/offline state of the WLAN terminal;

when an online data caching server is the AP, the second state transceiver module 233 receives the notice about the online/offline state of the WLAN terminal from the AP; and when the online data caching server is other network element except the AP, the second state transceiver module 233 receives the notice about the online/offline state of the WLAN terminal from the WLAN terminal, and sends the notice about the online/offline state of the WLAN terminal to the online data caching server.

The state recording and querying module 234 is configured to record the online/offline state of the WLAN terminal after receiving the notice about the online/offline state of the WLAN terminal, and is further configured to provide service of querying the online/offline state of the WLAN terminal for an application service server to develop a service according to a query result about the online/offline state of the WLAN terminal.

It is to be noted that the strategy sending module 232 and the second state transceiver module 233 may be implemented by a chip with a communication function in the online state server, and the strategy formulation module 231 and the state recording and querying module 234 may be implemented by a Central Processing Unit (CPU), Micro Processing Unit (MPU) or Digital Signal Processor (DSP) of the online state server.

Figure 5:
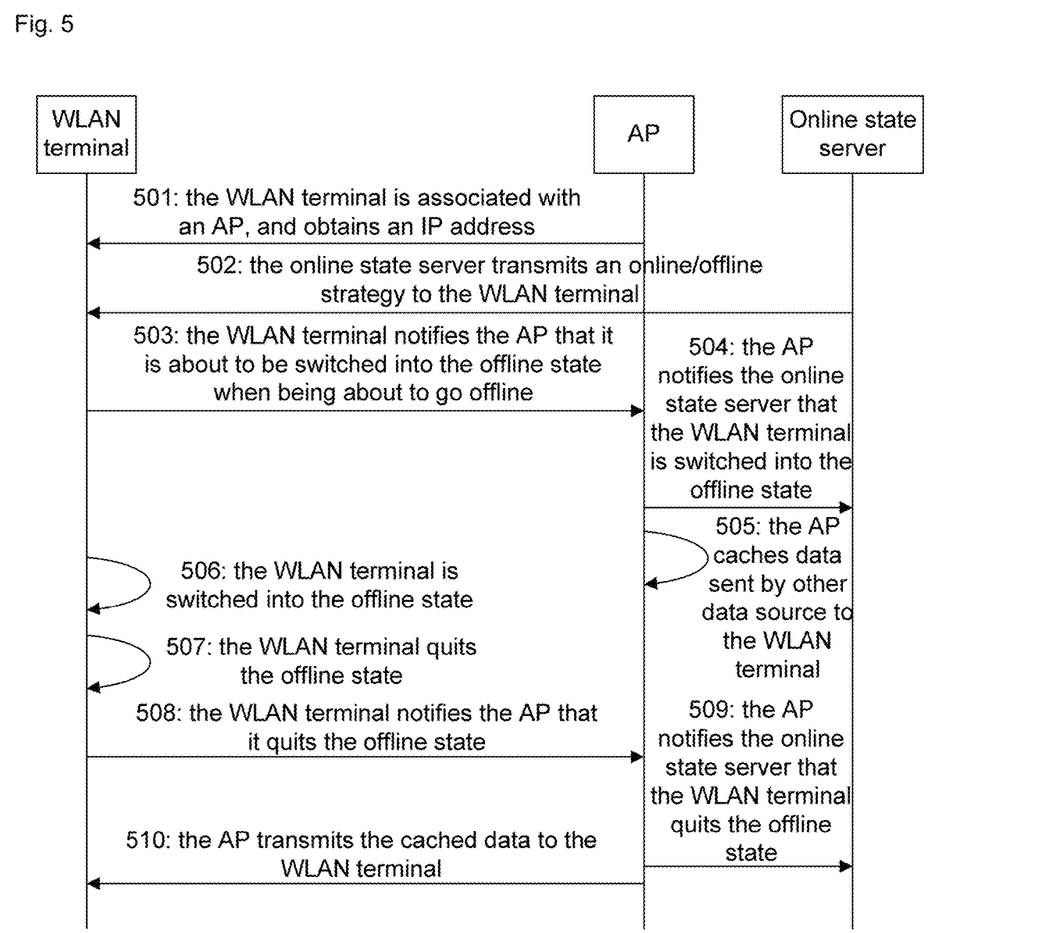
FIG. 5 is an implementation flowchart of method embodiment 1 according to the disclosure.

FIG. 5 is an implementation flowchart of method embodiment 1 according to the disclosure. In the embodiment, an AP serves as an online data caching server. As shown in FIG. 5, a method for keeping a WLAN terminal always online in the embodiment includes the following steps.

Step 501: the WLAN terminal is associated with the AP, and obtains an IP address.

Here, the WLAN terminal is associated with the AP for identity authentication through a WLAN interface, the WLAN terminal obtains the IP address from the AP after passing the identity authentication, and then the WLAN terminal performs data communication with a network.

Step 502: an online state server transmits an online/offline strategy to the WLAN terminal.

Here, the WLAN terminal is registered with the online state server, and requests to acquire the online/offline strategy formulated by the online state server, and the online state server may transmit the online/offline strategy to the WLAN terminal after successful registration.

In addition, the WLAN terminal may also obtain, under participation of other network element, the online/offline strategy formulated by the online state server, specifically, the online state server initiatively transmits the online/offline strategy to the WLAN terminal after learning, through the other network element, that the WLAN terminal passes the identity authentication.

In an online state of any WLAN terminal, the online state server may transmit an updated online/offline strategy to the WLAN terminal at any time.

In the embodiment, the online/offline strategy formulated by the online state server includes: online and offline moments, time lengths and an interval, wherein the online and offline time lengths and interval depend on factors such as a service requirement, a user requirement and a network condition, and are formulated by a network operating company and executed by the WLAN terminal; the WLAN changes the online/offline state of the WLAN terminal according to the online/offline strategy; and the WLAN terminal may periodically execute the online/offline strategy.

Step 503: the WLAN terminal notifies the AP that it is about to be switched into the offline state when being about to go offline.

Specifically, the WLAN terminal sets a Power Management field in an IEEE 802.11-based QoS null data message to be 1 when being about to go offline, and directly transmits the message to the AP to notify the AP that it is about to be switched into the offline state.

Step 504: the AP notifies the online state server that the WLAN terminal is switched into the offline state.

Specifically, the AP may notify the online state server that the corresponding WLAN terminal is switched into the offline state after receiving notification from the WLAN terminal.

Preferably, the online state server records the online/offline state of the WLAN terminal so as to provide the online/offline state of the WLAN terminal for a third party, for example: the online state server may provide query service for an application service server, and the application service server sends a request of querying the state of the WLAN terminal to the online state server, inquires about the online/offline state of the WLAN terminal from the online state server, and develops a service according to a query result about the online/offline state of the WLAN terminal.

Specifically, if the query result is that the WLAN terminal is online, a corresponding application program may directly communicate with the WLAN terminal; and if the query result is that the WLAN terminal is offline, the corresponding application program may delay communication with the WLAN terminal.

Step 505: the AP caches data sent by other data source to the WLAN terminal.

Step 506: the WLAN terminal is switched into the offline state.

Here, the WLAN terminal is switched into the offline state, that is: a WLAN module of the WLAN terminal is switched into a sleep state to save power, and then the WLAN terminal does not receive and send any data.

Step 507: the WLAN terminal quits the offline state.

In the embodiment, the WLAN terminal may automatically quit the offline state according to the online/offline strategy after the offline time length is reached, the WLAN module of the WLAN terminal is switched into an active state, and the WLAN terminal performs normal data communication with the network.

Step 508: the WLAN terminal notifies the AP that it quits the offline state.

Specifically, the WLAN terminal sets the Power Management field in the 802.11-based QoS null data message to be 0, and sends the message to the AP to notify the AP that it quits the offline state.

Step 509: the AP notifies the online state server that the WLAN terminal quits the offline state.

Step 510: the AP transmits the cached data to the WLAN terminal.

Here, the AP transmits the data cached when the WLAN terminal is in the offline state to the WLAN terminal after receiving from the WLAN terminal the notice of quitting the offline state, and then the WLAN terminal performs normal data communication with the network.

Then, the WLAN terminal may return to execute Step 503 according to the online/offline strategy after the online time length is reached.

During a practical application, Step 504, Step 505 and Step 506 are simultaneously executed after Step 503.

The embodiment adopting the AP as the online data caching server is applicable to a data communication process in which a small amount of information is involved, such as a personal network or an enterprise network in a WLAN mode.

Figure 6:
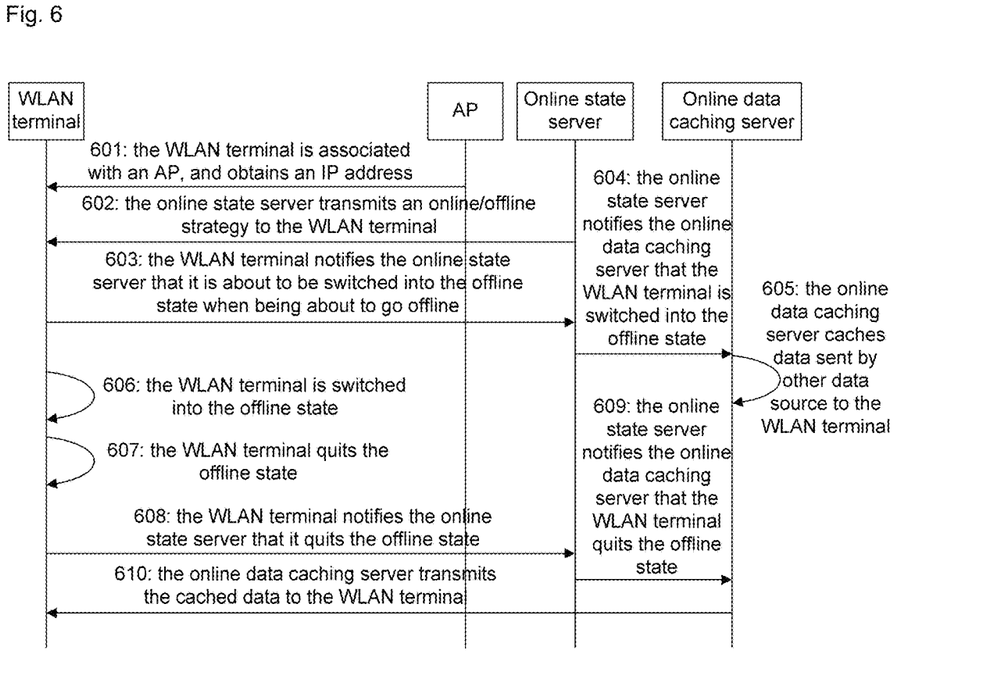
FIG. 6 is an implementation flowchart of method embodiment 2 according to the disclosure.

FIG. 6 is an implementation flowchart of method embodiment 2 according to the disclosure. In the embodiment, other network element serves as an online data caching server. As shown in FIG. 6, a method for keeping a WLAN terminal always online in the embodiment includes the following steps.

Step 601: the WLAN terminal is associated with an AP, and obtains an IP address.

Here, the WLAN terminal is associated with the AP for identity authentication through a WLAN interface, the WLAN terminal obtains the IP address from the AP after passing the identity authentication, and then the WLAN terminal performs data communication with a network.

Step 602: an online state server transmits an online/offline strategy to the WLAN terminal.

Here, the WLAN terminal is registered with the online state server, and requests to acquire the online/offline strategy formulated by the online state server, and the online state server may transmit the online/offline strategy to the WLAN terminal after successful registration.

In addition, the WLAN terminal may also obtain the online/offline strategy formulated by the online state server under participation of other network element, specifically, the online state server initiatively transmits the online/offline strategy to the WLAN terminal after learning through other network element that the WLAN terminal passes identity authentication.

In an online state of any WLAN terminal, the online state server may transmit an updated online/offline strategy to the WLAN terminal at any time.

In the embodiment, the online/offline strategy formulated by the online state server includes: online and offline moments, time lengths and an interval, wherein the online and offline time lengths and interval depend on factors such as a service requirement, a user requirement and a network condition, and are formulated by a network operating company and executed by the WLAN terminal; the WLAN changes the online/offline state of the WLAN terminal according to the online/offline strategy; and the WLAN terminal may periodically execute the online/offline strategy.

Step 603: the WLAN terminal notifies the online state server that it is about to be switched into the offline state when being about to go offline.

Step 604: the online state server notifies the online data caching server that the WLAN terminal is switched into the offline state.

Specifically, the online state server may notify the online data caching server that the corresponding WLAN terminal is switched into the offline state after receiving a notification from the WLAN terminal.

Preferably, the online state server records the online/offline state of the WLAN terminal so as to provide information about the online/offline state of the WLAN terminal for a third party, and for example: the online state server may provide query service for an application service server, and the application service server sends a request of querying the state of the WLAN terminal to the online state server, queries the online/offline state of the WLAN terminal from the online state server, and develops a service according to a query result about the online/offline state of the WLAN terminal.

Specifically, if the query result is that the WLAN terminal is online, a corresponding application program may directly communicate with the WLAN terminal; and if the query result is that the WLAN terminal is offline, the corresponding application program may delay communication with the WLAN terminal.

Step 605: the online data caching server caches data sent by other data source to the WLAN terminal.

Step 606: the WLAN terminal is switched into the offline state.

Here, the WLAN terminal is switched into the offline state, that is: a WLAN module of the WLAN terminal is switched into a sleep state to save power, and then the WLAN terminal does not receive and send any data.

Step 607: the WLAN terminal quits the offline state.

In the embodiment, the WLAN terminal may automatically quit the offline state according to the online/offline strategy after the offline time length is reached, the WLAN module of the WLAN terminal is switched into an active state, and the WLAN terminal performs normal data communication with the network.

Step 608: the WLAN terminal notifies the online state server that it quits the offline state.

Step 609: the online state server notifies the online data caching server that the WLAN terminal quits the offline state.

Step 610: the online data caching server transmits the cached data to the WLAN terminal.

Here, the online data caching server transmits the data cached when the WLAN terminal is in the offline state to the WLAN terminal after receiving the notice of quitting the offline state from the WLAN terminal, and then the WLAN terminal performs normal data communication with the network.

Then, the WLAN terminal may return to execute Step 603 according to the online/offline strategy after the online time length is reached.

During a practical application, Step 604, Step 605 and Step 606 are simultaneously executed after Step 603.

The embodiment adopting other network element as the online data caching server is applicable to a data communication process in which a large amount of information is involved, such as a public service network in a WLAN mode.

Based on the two embodiments shown in FIG. 5 and FIG. 6 and their specific implementation flows, it can be seen that both an AP and other network element may be adopted as the online data caching server, and are applicable to different application environments with a small amount of information and a large amount of information respectively. Therefore, in a preferred application example of the disclosure, before the data sent to the WLAN terminal is cached, whether the amount of data information to be cached is large or small may be determined at first, and if the amount of the data information to be cached is large, other network element serving is adopted as the online data caching server to cache the data sent to the WLAN terminal from the other data source; and if the amount of the data information to be cached is small, the AP is adopted as the online data caching server to cache the data sent to the WLAN terminal from other data source.

Figure 7:
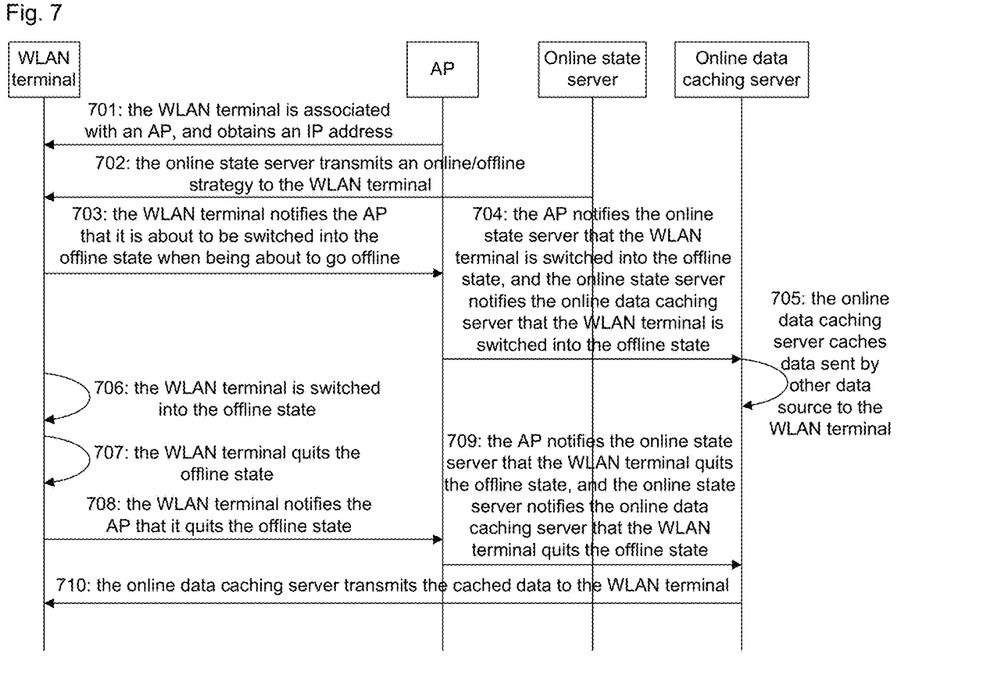
FIG. 7 is an implementation flowchart of method embodiment 3 according to the disclosure.

FIG. 7 is an implementation flowchart of method embodiment 3 according to the disclosure. In the embodiment, other network element is adopted as an online data caching server, and an AP forwards an online/offline state message of a WLAN terminal. As shown in FIG. 7, a method for keeping a WLAN terminal always online in the embodiment includes the following steps.

Step 701: the WLAN terminal is associated with the AP, and obtains an IP address.

Here, the WLAN terminal is associated with the AP for identity authentication through a WLAN interface, the WLAN terminal obtains the IP address from the AP after passing identity authentication, and then the WLAN terminal performs data communication with a network.

Step 702: an online state server transmits an online/offline strategy to the WLAN terminal.

Here, the WLAN terminal is registered with the online state server, and requests to acquire the online/offline strategy formulated by the online state server, and the online state server may transmit the online/offline strategy to the WLAN terminal after successful registration.

In addition, the WLAN terminal may also obtain the online/offline strategy formulated by the online state server under participation of other network element, specifically, the online state server initiatively transmits the online/offline strategy to the WLAN terminal after learning through other network element that the WLAN terminal passes identity authentication.

In an online state of any WLAN terminal, the online state server may transmit an updated online/offline strategy to the WLAN terminal at any time.

In the embodiment, the online/offline strategy formulated by the online state server includes: online and offline moments, time lengths and an interval, wherein the online and offline time lengths and interval depend on factors such as a service requirement, a user requirement and a network condition, and are formulated by a network operating company and executed by the WLAN terminal; the WLAN changes the online/offline state of the WLAN terminal according to the online/offline strategy; and the WLAN terminal may periodically execute the online/offline strategy.

Step 703: the WLAN terminal notifies the AP that it is about to be switched into the offline state when being about to go offline.

Specifically, the WLAN terminal sets a Power Management field in an IEEE 802.11-based QoS null data message to be 1 when being about to go offline, and directly transmits the message to the AP to notify the AP that it is about to be switched into the offline state.

Step 704: the AP notifies the online state server that the WLAN terminal is switched into the offline state, and the online state server notifies the online data caching server that the WLAN terminal is switched into the offline state.

Preferably, the online state server records the online/offline state of the WLAN terminal so as to provide the online/offline state of the WLAN terminal for a third party, for example: the online state server may provide query service for an application service server, and the application service server sends a request of querying the state of the WLAN terminal to the online state server, queries the online/offline state of the WLAN terminal from the online state server, and develops a service according to a query result about the online/offline state of the WLAN terminal.

Specifically, if the query result is that the WLAN terminal is online, a corresponding application program may directly communicate with the WLAN terminal; and if the query result is that the WLAN terminal is offline, the corresponding application program may delay communication with the WLAN terminal.

Step 705: the online data caching server caches data sent by other data source to the WLAN terminal.

Step 706: the WLAN terminal is switched into the offline state.

Here, the WLAN terminal is switched into the offline state, that is: a WLAN module of the WLAN terminal is switched into a sleep state to save power, and then the WLAN terminal does not receive and send any data.

Step 707: the WLAN terminal quits the offline state.

In the embodiment, the WLAN terminal may automatically quit the offline state according to the online/offline strategy after the offline time length is reached, the WLAN module of the WLAN terminal is switched into an active state, and the WLAN terminal performs normal data communication with the network.

Step 708: the WLAN terminal notifies the AP that it quits the offline state.

Specifically, the WLAN terminal sets the Power Management field in the 802.11-based QoS null data message to be 0, and sends the message to the AP to notify the AP that it quits the offline state.

Step 709: the AP notifies the online state server that the WLAN terminal quits the offline state, and the online state server notifies the online data caching server that the WLAN terminal quits the offline state.

Step 710: the online data caching server transmits the cached data to the WLAN terminal.

Here, the online data caching server transmits the data cached when the WLAN terminal is in the offline state to the WLAN terminal after receiving from the WLAN terminal the notice of quitting the offline state, and then the WLAN terminal performs normal data communication with the network.

Then, the WLAN terminal may return to execute Step 703 according to the online/offline strategy after the online time length is reached.

During a practical application, Step 704, Step 705 and Step 706 are simultaneously executed after Step 703.

The embodiment adopting other network element as the online data caching server and adopting the AP to forward the online/offline state message of the WLAN terminal is another implementable mode of the embodiment adopting other network element as the online data caching server, and is applicable to a data communication process in which a large amount of information is involved, such as a public service network in a WLAN mode.

Correspondingly, an embodiment of the disclosure further provides a method for keeping a WLAN terminal always online, which includes that:

acquiring a notice about an online/offline state change made when the WLAN terminal has been switched into an online state or is about to be switched into an offline state according to an online/offline strategy formulated by an online state server;

caching data sent by each data source to the WLAN terminal after the WLAN terminal is switched into the offline state; and transmitting the cached data to the WLAN terminal after the WLAN terminal is switched into the online state.

An embodiment of the disclosure further provides a computer-readable storage medium, which includes a set of instructions, the instructions being configured to execute the method for keeping the WLAN terminal always online in the embodiment of the disclosure.

Those skilled in the art should know that the embodiments of the disclosure may be provided as a method, a system or a computer program product. Therefore, the disclosure may adopt a hardware embodiment, software embodiment and a combined software and hardware embodiment. Moreover, the disclosure may adopt a computer program product implemented on one or more computer-available storage media (including, but not limited to, a disk memory, an optical memory and the like) including computer-available program codes.

The disclosure is described with reference to flowcharts and/or block diagrams of a method, device (system) and a computer program product according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only the preferred implementation modes of the disclosure and not intended to limit the scope of protection of the disclosure.

What is claimed is:

1. A system for keeping a Wireless Local Area Network (WLAN) terminal always online, comprising the WLAN terminal, an online state server and an online data caching server, wherein
the WLAN terminal is configured to receive and execute an online/offline strategy formulated by the online state server, and notify the online state server of a state change of the WLAN terminal when a state of the WLAN terminal has been switched into an online state or is about to be switched into an offline state;
the online state server is configured to formulate and send the online/offline strategy to the WLAN terminal; and
the online data caching server is configured to receive a notice about the online/offline state of the WLAN terminal, cache data sent by each data source to the WLAN terminal after the WLAN terminal is switched into the offline state, and transmit the cached data to the WLAN terminal after the WLAN terminal is switched into the online state; wherein the offline state is a Power Save (PS) state, and the online state is an Active state;
wherein the online data caching server is an AP or other network element except the AP; when the online data caching server is the AP, the WLAN terminal is configured to directly notify the online data caching server of the online/offline state of the WLAN terminal when the state of the WLAN terminal has been switched into the online state or is about to be switched into the offline state; the online data caching server is configured to receive the notice about the online/offline state of the WLAN terminal, and notify the online state server of the online/offline state of the WLAN terminal;
when the online data caching server is other network element except the AP, the WLAN terminal is configured to notify the online state server of the online/offline state of the WLAN terminal when the state of the WLAN terminal has been switched into the online state or is about to be switched into the offline state; and the online state server is configured to receive the notice about the online/offline state of the WLAN terminal, and notify the online data caching server of the online/offline state of the WLAN terminal.

2. The system according to claim 1, further comprising: an Access Point (AP), configured to be associated with the WLAN terminal, wherein the WLAN terminal is further configured to be associated with the AP for identity authentication, and obtain an Internet Protocol (IP) address after passing the identity authentication.

3. The system according to claim 1, wherein the online state server is further configured to record the online/offline state of the WLAN terminal after receiving the state change notified by the WLAN terminal.

4. The system according to claim 1, wherein
the WLAN terminal is further configured to be registered with the online state server, and request to acquire the online/offline strategy formulated by the online state server; and
correspondingly, the online state server is further configured to transmit the online/offline strategy to the WLAN terminal after successful registration.

5. The system according to claim 1, wherein the online state server is further configured to initiatively transmit the online/offline strategy to the WLAN terminal after learning that the WLAN terminal passes identity authentication through other network element.

6. The system according to claim 3, further comprising: an application service server, configured to query the online/offline state of the WLAN terminal from the online state server, and develop a service according to a query result about the online/offline state of the WLAN terminal.

7. An online data caching server for keeping a Wireless Local Area Network (WLAN) terminal always online, comprising: a first state transceiver module, a caching module and a cached data sending module, wherein
the first state transceiver module is configured to receive and send a notice about an online/offline state of the WLAN terminal;
the caching module is configured to cache data sent by each data resource to the WLAN terminal after the WLAN terminal is switched into the offline state; and
the cached data sending module is configured to transmit the data cached by the caching module to the WLAN terminal after the WLAN terminal is switched into the offline state;
wherein the offline state is a Power Save (PS) state, and the online state is an Active state;
wherein when the online data caching server is the AP, the online data caching server is configured to receive a notice about the online/offline state of the WLAN terminal sent by the WLAN terminal, and notify the online state server of the online/offline state of the WLAN terminal;
when the online data caching server is other network element except the AP, the online data caching server is configured to receive a notice about the online/offline state of the WLAN terminal sent by the online state server; wherein the notice about the online/offline state of the WLAN terminal is sent to the online state server by the WLAN terminal.

8. The online data caching server according to claim 7, wherein the notice is a notice which is sent by the first state transceiver module according to an online/offline strategy formulated by an online state server when the WLAN terminal has been switched into the online state or is about to be switched into the offline state.

9. An online state server for keeping a Wireless Local Area Network (WLAN) terminal always online, comprising: a strategy formulation module, a strategy sending module, a second state transceiver module and a state recording and querying module, wherein
the strategy formulation module is configured to formulate an online/offline strategy for the WLAN terminal;
the strategy sending module is configured to send the online/offline strategy formulated by the strategy formulation module to the WLAN terminal;
the second state transceiver module is configured to receive and send a notice about an online/offline state, determined by the online/offline strategy, of the WLAN terminal; and
the state recording and querying module is configured to record the online/offline state of the WLAN terminal after receiving the notice about the online/offline state of the WLAN terminal, and provide service of querying the online/offline state of the WLAN terminal for an application service server;
wherein the offline state is a Power Save (PS) state, and the online state is an Active state;
wherein the second state transceiver module is further configured to receive a notice about the online/offline state of the WLAN terminal sent by the online data caching server, wherein the notice about the online/offline state of the WLAN terminal is sent to the online data caching server by the WLAN terminal; or the second state transceiver module is further configured to receive a notice about the online/offline state of the WLAN terminal sent by the WLAN terminal, and notify the online data caching server of the online/offline state of the WLAN terminal.

10. A method for keeping a Wireless Local Area Network (WLAN) terminal always online, comprising:

receiving and executing, by the WLAN terminal, an online/offline strategy formulated by an online state server, and notifying the online state server of a state change of the WLAN terminal when a state of the WLAN terminal has been switched into an online state or is about to be switched into an offline state;

receiving, by an online data caching server, a notice about the online/offline state of the WLAN terminal, and caching data sent by each data source to the WLAN terminal after the WLAN terminal is switched into the offline state; and transmitting, by the online data caching server, the cached data to the WLAN terminal after the WLAN terminal is switched into the online state;

wherein the offline state is a Power Save (PS) state, and the online state is an Active state;

wherein the online data caching server is an AP or other network element except the AP; when the online data caching server is the AP, the WLAN terminal directly notifies the online data caching server of the online/offline state of the WLAN terminal when the state of the WLAN terminal has been switched into the online state or is about to be switched into the offline state, and the online data caching server receives the notice about the online/offline state of the WLAN terminal, and notifies the online state server of the online/offline state of the WLAN terminal;

when the online data caching server is other network element except the AP, the WLAN terminal notifies the online state server of the online/offline state of the WLAN terminal when the state of the WLAN terminal has been switched into the online state or is about to be switched into the offline state, and the online state server receives the notice about the online/offline state of the WLAN terminal, and notifies the online data caching server of the online/offline state of the WLAN terminal.

11. The method according to claim 10, further comprising:

before receiving the online/offline strategy, associating the WLAN terminal with an Access Point (AP) for identity authentication and obtaining an Internet Protocol (IP) address after passing the identity authentication.

12. The method according to claim 10, further comprising:

recording, by the online state server, the online/offline state of the WLAN terminal after receiving the state change notified by the WLAN terminal.

13. The method according to claim 10, wherein receiving, by the WLAN terminal, the online/offline strategy formulated by the online state server comprises:

registering the WLAN terminal with the online state server, and requesting, by the WLAN terminal, to acquire the online/offline strategy formulated by the online state server, and transmitting, by the online state server, the online/offline strategy to the WLAN terminal after successful registration; or, initiatively transmitting, by the online state server, the online/offline strategy to the WLAN terminal after learning through other network element that the WLAN terminal passes the identity authentication.

14. The method according to claim 12, further comprising: querying, by an application service server, the online/offline state of the WLAN terminal from the online state server, and developing a service according to a query result about the online/offline state of the WLAN terminal.

15. A method for keeping a Wireless Local Area Network (WLAN) terminal always online, comprising:

acquiring a notice about an online/offline state change made when the WLAN terminal has been switched into an online state or is about to be switched into an offline state according to an online/offline strategy formulated by an online state server;

caching data sent by each data source to the WLAN terminal after the WLAN terminal is switched into the offline state; and transmitting the cached data to the WLAN terminal after the WLAN terminal is switched into the online state;

wherein the offline state is a Power Save (PS) state, and the online state is an Active state;

wherein the acquiring a notice about an online/offline state change made comprises:

receiving a notice about the online/offline state of the WLAN terminal sent by the WLAN terminal, in order to notify the online state server of the online/offline state of the WLAN terminal; or receiving a notice about the online/offline state of the WLAN terminal sent by the online state server; wherein the notice about the online/offline state of the WLAN terminal is sent to the online state server by the WLAN terminal.

16. A non-transitory computer-readable storage medium, comprising a set of instructions, the instructions being configured to execute the method for keeping a WLAN terminal always online according to claim 15.

* * * * *